(12) United States Patent
Charters

(10) Patent No.: US 7,853,625 B2
(45) Date of Patent: Dec. 14, 2010

(54) SYSTEM FOR DEFINING DATA MAPPINGS BETWEEN DATA STRUCTURES

(75) Inventor: Graham C. Charters, Southampton (DE)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/056,023

(22) Filed: Mar. 26, 2008

(65) Prior Publication Data

US 2008/0222171 A1   Sep. 11, 2008

Related U.S. Application Data

(63) Continuation of application No. 10/726,316, filed on Dec. 2, 2003, now Pat. No. 7,379,938.

(30) Foreign Application Priority Data

Dec. 19, 2002   (DE) .................................... 0229724
Dec. 19, 2002   (GB) ................................. 0229724.0

(51) Int. Cl.
*G06F 17/30* (2006.01)
(52) U.S. Cl. ....................................... 707/809; 707/756
(58) Field of Classification Search ................ 707/756, 707/803, 809, 999.1, 999.103
See application file for complete search history.

(56) References Cited

U.S. PATENT DOCUMENTS

| 6,163,776 | A | 12/2000 | Periwal |
| 6,560,608 | B1 | 5/2003 | Tomm et al. |
| 6,757,739 | B1 * | 6/2004 | Tomm et al. ................. 709/236 |
| 6,865,573 | B1 | 3/2005 | Hornick et al. |
| 6,874,141 | B1 | 3/2005 | Swamy et al. |
| 6,904,598 | B2 | 6/2005 | Abileah et al. |
| 2004/0019589 | A1 | 1/2004 | Basrur |
| 2004/0093342 | A1 | 5/2004 | Arbo |
| 2004/0177058 | A1 | 9/2004 | Carpentier et al. |

* cited by examiner

*Primary Examiner*—Cheryl Lewis
(74) *Attorney, Agent, or Firm*—Samuel K. Simpson; Patent Ingenuity, P.C.

(57) ABSTRACT

Computer system and program for defining data mappings between data elements in a first data structure and data elements in a second data structure are provided. The computer system executes instructions for selecting a first data element in the first data structure for mapping, suggesting a first possible data mapping definition to a user based on a first previous data mapping definition, the first possible data mapping definition defining a mapping from the first data element in the first data structure to a first data element in the second data structure, and mapping the first data element in the first data structure to the first data element in the second data structure according to the first possible data mapping definition in response to acceptance of the first possible data mapping definition by the user.

16 Claims, 6 Drawing Sheets

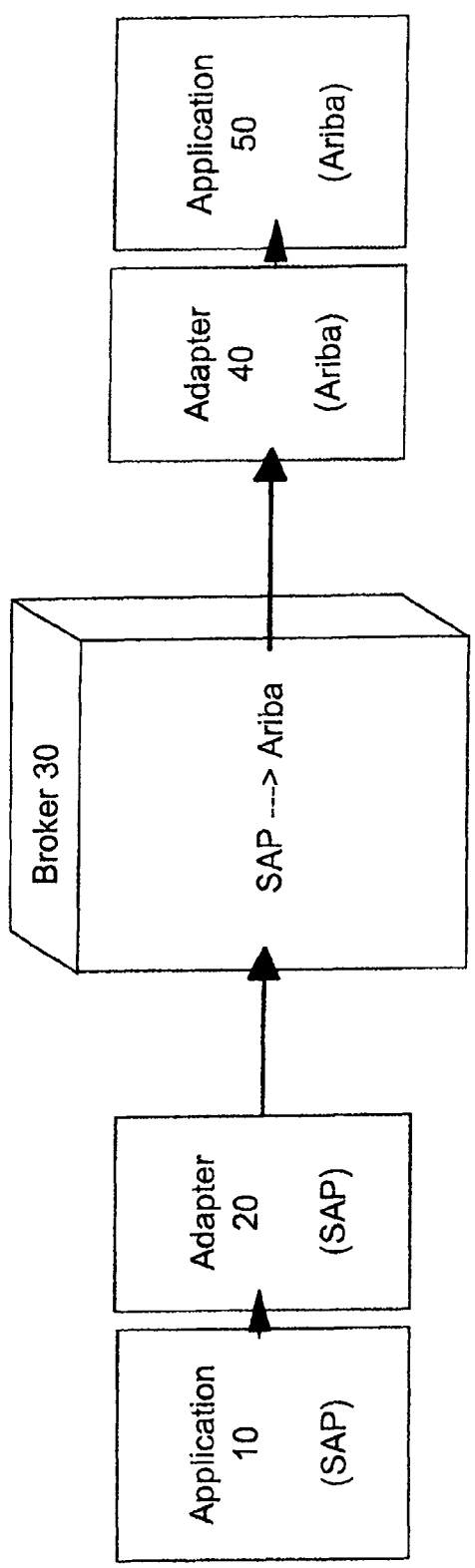
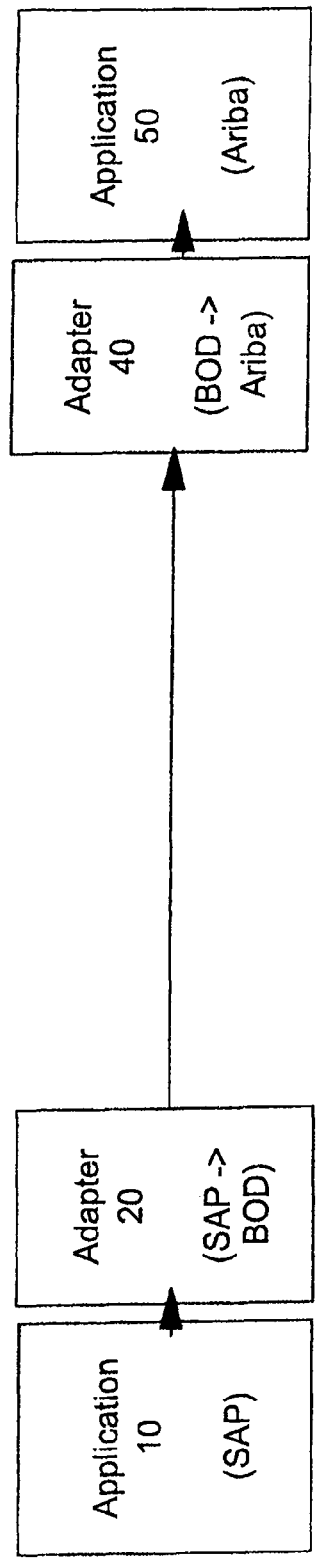
Figure 1a (Prior Art)
Figure 1b (Prior Art)

SYSTEM FOR DEFINING DATA MAPPINGS BETWEEN DATA STRUCTURES

CROSS-REFERENCE TO RELATED APPLICATIONS

This application is a continuation of U.S. patent application Ser. No. 10/726,316, now U.S. Pat. No. 7,379,938, filed Dec. 2, 2003, entitled "Method for Defining a Data Mapping Between Two or More Data Structure", which claims the benefit of United Kingdom Application No. 0229724.0, filed Dec. 19, 2002. U.S. patent application Ser. No. 10/726,316 is hereby incorporated by reference for all purposes as if fully set forth herein.

FIELD OF INVENTION

The invention relates to the field of data transformations or mapping, and more specifically to the definition of such transformations.

BACKGROUND OF THE INVENTION

Distributed systems typically comprise a multitude of heterogeneous applications all communicating using different languages. In order for two such different applications to communicate with one another, it is necessary that data in a format A from the first application is transformed into data in a format B understood by the second application. FIG. 1a shows a first example of the components that enable such a transformation to take place.

Application 10, by way of example, uses a SAP internal data format. In order to communicate with application 50, a request from application 10 may go via a message broker/intermediary system 30. Adapter 20 interfaces with Application 10 and transfers the SAP internal formatted message to broker 30. At the broker it is determined that the message is destined for application 50 which uses an Ariba internal format. The broker therefore transforms the message received from application 10 into an Ariba internal message format suitable for transferring the message to application 50. Upon receipt of this message, adapter 40 interfaces with application 50 and communicates the Ariba formatted message.

It should however be appreciated from the above that the number of individual transformations required can be huge. A formula for determining the number of transformations is n*n−1, where n is the number of data types used (e.g. message sets, where a message set is the set of messages understood by one application), and we are defining transformations in both directions.

For this reason an alternative solution was developed. Referring to FIG. 1b, a "standard" format for communication is agreed upon by adapters 20 and 40. One example of such a format is the Business Object Document (BOD) specification defined by the Open Applications Group. When application 10 wishes to communicate with application 50, adapter 20 converts the data into BOD form which is received by adapter 40 and transformed into the Ariba data format. The number of transformations now is 2*n. Therefore for small numbers of applications there is no benefit, (e.g. 2 applications=4 transformations vs. 2 in the original design of FIG. 1a), but for larger numbers of applications the benefits are important (e.g. 5 applications=10 transformations vs. 20 in the original design of FIG. 1a). While FIGS. 1a and 1b show different integration topologies, this is not relevant to the transformation reduction. It is possible, for example, to achieve the same results by transforming to the "standard" format in the intermediary system.

Nevertheless, it will be appreciated that a highly labour intensive activity when performing Enterprise Application Integration is the definition of data/message transformations. Each message set can be large and complex and typically consists of a number of different messages each containing a variety of different fields. For example, the OAG BOD standard version 7.1 has over 180 different messages. Ordinarily the user selects source and target messages and a tool presents them side by side. The user then defines the relationships between fields in the source message and fields in the target message.

With reference to FIG. 2 it can be seen that message set A has a "part" message containing the fields "name"; "id"; "price"; and "description". Message set B has a corresponding message and fields but uses different terms to refer to these. Thus a user has to identify that the "part" message in message set A corresponds to the "item" message in message set B. The user then has to map the fields within the "part" message to the fields within the "item" message. Thus "name" is mapped to "prodname"; and "ID" is mapped to "identifier" etc.

This example is simple in that there is only one message in each set and there is a one to one correspondence between the fields. The reality is however typically far more complicated in that there may be numerous message sets; messages and fields to contend with and that there is not necessarily a one to one correspondence between the fields in two messages. Thus it is typically an onerous task to define the required transformations between messages in different message sets.

SUMMARY OF THE INVENTION

The present invention is directed to a computer system and a computer program for defining data mappings between data elements in a first data structure and data elements in a second data structure. The computer system executes instructions for selecting a first data element in the first data structure for mapping, suggesting a first possible data mapping definition to a user based on a first previous data mapping definition, the first possible data mapping definition defining a mapping from the first data element in the first data structure to a first data element in the second data structure, and mapping the first data element in the first data structure to the first data element in the second data structure according to the first possible data mapping definition in response to acceptance of the first possible data mapping definition by the user, wherein the first previous data mapping definition defines a mapping from a data element in a third data structure to a data element in a fourth data structure, at least one of the third and fourth data structures being different from the first and second data structures.

DESCRIPTION OF DRAWINGS

FIGS. 1a and 1b illustrate an overview of enterprise application integration (which includes message transformation) according to the prior art.

DETAILED DESCRIPTION

The present invention relates to defining data mappings between data structures. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
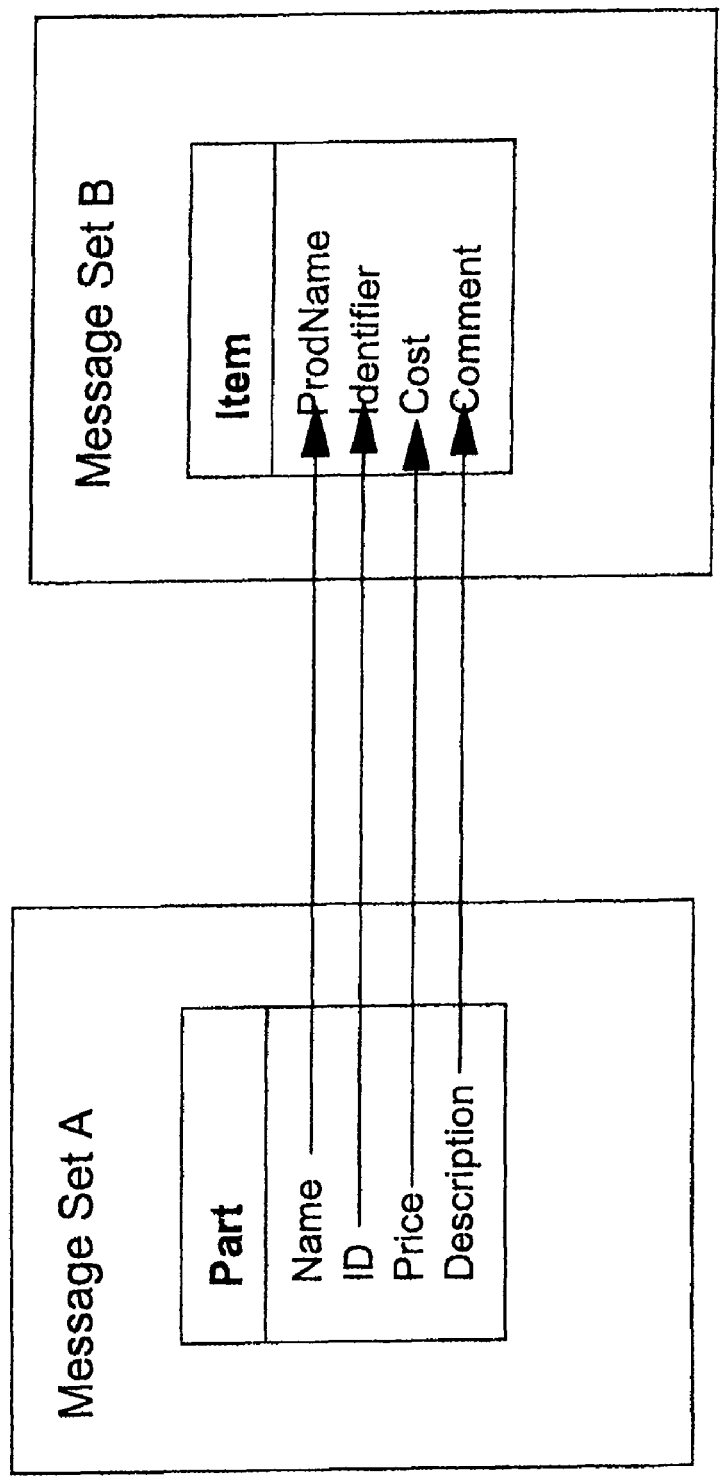
FIG. 2 illustrates a defined correspondence between two message sets according to the prior art.
Figure 3A:
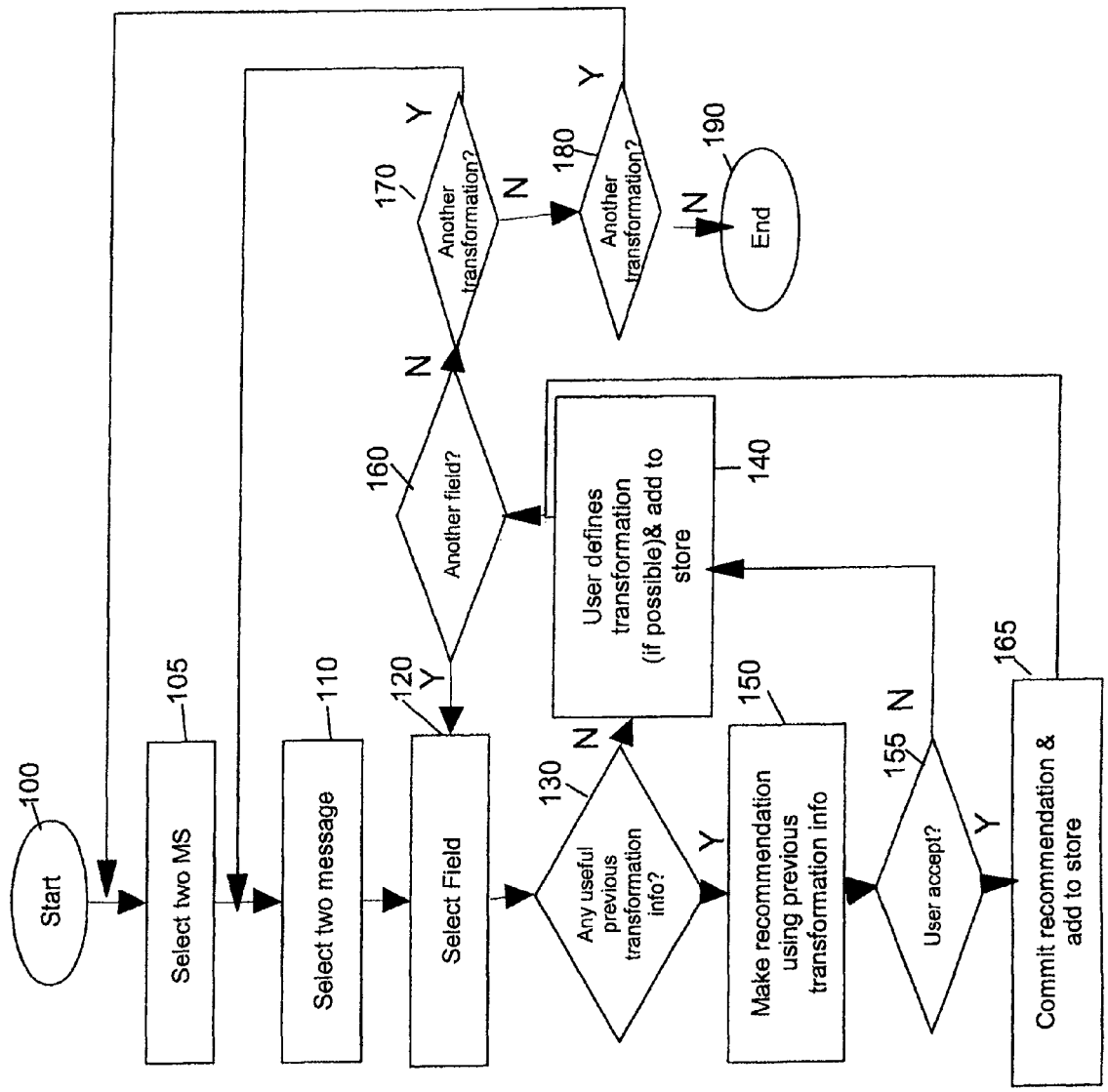
FIGS. 3a, 3b, 4 and 5 illustrate message transformation according to embodiments of the present invention.
Figure 3B:
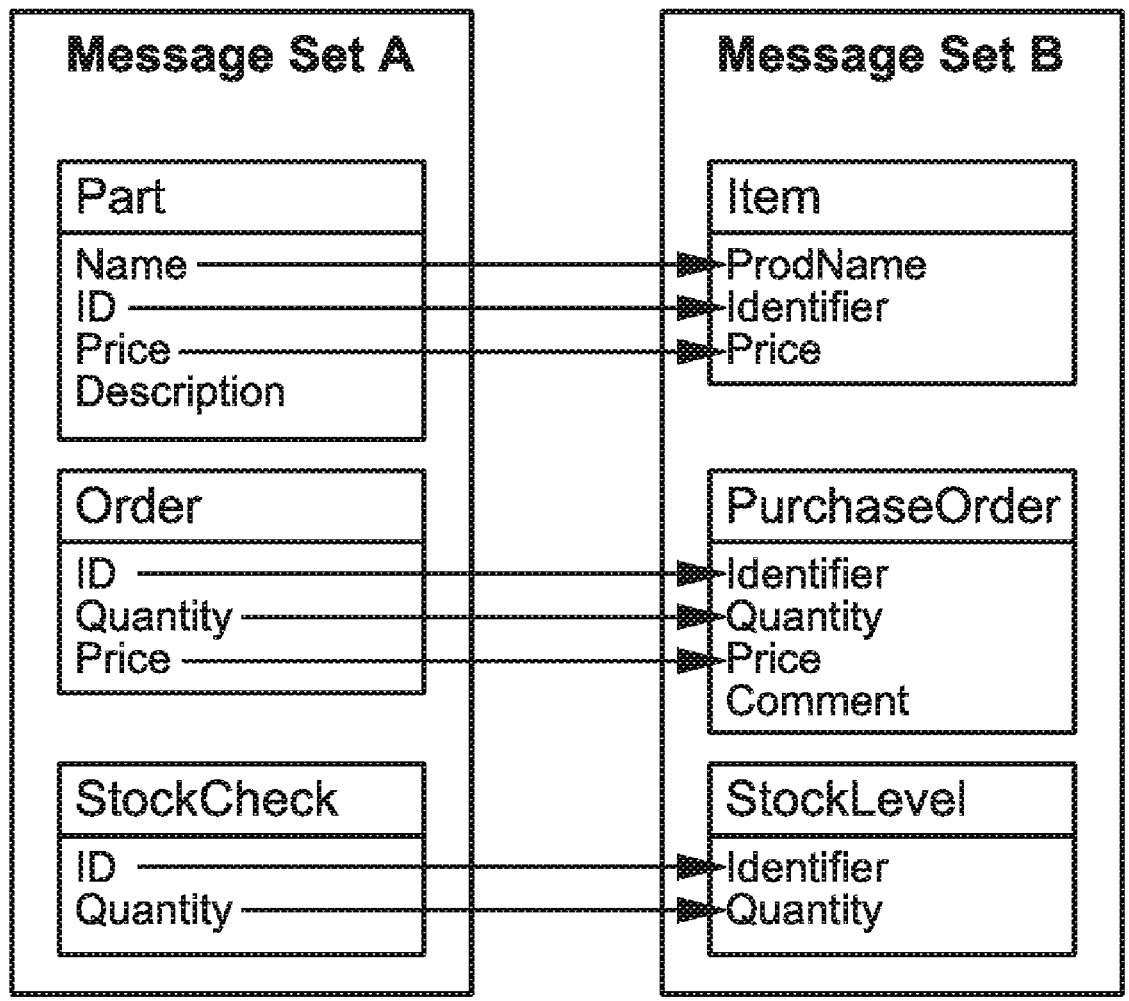

Throughout the specification, the terms transformation and mapping will be used interchangeably. In the preferred embodiment, the data structures can be treated as message sets. With reference to FIGS. 3a and 3b, two message sets (MS) are selected by a user (A and B, step 100; 105). A source message and a target message are then selected by the user (step 110). (In this example the source message is Part and the target message is Item.) From message Part a field (Name) is chosen (step 120).

It is determined whether there is any previous transformation definition information which might be of use here (step 130) and since there is not, the user defines this transformation, mapping the Name field to ProdName in the Item message of message set B (step 140). Information regarding this transformation is held in non-volatile storage for possible future use (step 140). (Note, there may not always be a corresponding field to map to in a target message—see below.) Following the same process, the user also defines Part.ID and Part.Price. As can be seen from FIG. 3b, these are mapped to Item.Identifier and Item.Price (steps 160; 120; 130; 140). There is no corresponding field for Part.Description in the Item message and so the transformation for this field is not defined.

Having defined transformations for all the fields in the Part message for which there are corresponding fields in the Item message, it is determined at step 170 that there is another source message (Order) in set A and a target message in set B between which transformations are to be defined (step 110). Field ID is selected from this message (step 120). Part.ID was previously defined as mapping to Item.Identifer, thus it is deduced that any field named ID in message set A is likely to map to any field named Identifier in message set B (step 130).

In message set B a PurchaseOrder message exists and this message includes the field Identifier. Thus a suggestion is made to the user that Order.ID might map to PurchaseOrder.Identifer. The user chooses to accept PurchaseOrder.Identifier as the correct definition of Order.ID and thus this recommendation is executed and information regarding this choice is added to non-volatile memory (step 155; 165).

The next field in message Order is Quantity (steps 160; 120). Quantity is not a field that has been seen before and so the user defines its correspondence to PurchaseOrder.Quantity and information regarding this is added to non-volatile memory (steps 130, 140). However with Order.Price, the system has previously seen that Part.Price maps to Item.Price and therefore suggests that Order.Price might map to PurchaseOrder.Price (steps 160; 120; 130; 150). The user then chooses to accept this recommendation and it is executed and information regarding this choice added to non-volatile memory (step 155; 165).

The process continues with StockCheck.ID (steps 160; 170; 110; 120). Previously Part.ID was mapped to Item.Identifer; and Order.ID was mapped to PurchaseOrder.Identifer. The system thus deduces that StockCheck.ID might well map to StockLevel.Identifier (steps 130; 150). In this example, the user chooses to accept the recommendation and this is executed and information regarding this action is stored in non-volatile memory (steps 155, 165). Finally StockCheck.Quantity possibly maps to StockLevel.Quantity based on the previous transformation of Order.Quantity to PurchaseOrder.Quantity (steps 160; 120; 130; 150). Again this is accepted and executed (step 155, 165).

Because there are now no more messages in set A (step 170), it is determined whether there are any more message sets for which transformation are to be defined (step 180). Note this may mean defining a transformation between a current message set and a new message set or between two completely new message sets. If there are any more message sets, then the process returns to step 105 starts over again. Otherwise, the process ends at step 190.

The preferred embodiment of the present invention can aid the user in a number of different ways. Prioritization of recommendations is discussed in more detail later; however it will be briefly discussed here. For example, if the user has defined Order.ID as mapping to PurchaseOrder.Identifier, thus it is known to the system that there is a correspondence between the Order message in set A and the PurchaseOrder message in set B. It can use this information to prioritize suggestions about possible future transformation definitions (e.g. Order in message set A might map to PurchaseOrder in previously unseen message set C).

Further, the storage of information at step 165 can be used to prioritize suggestions. For example, the previous definition information used to make the current recommendation may have come from a transformation between two different messages sets (see below), if the user selects that recommendation for messages sets A and B this information can be stored to prioritize this recommendation for other transformation definitions relating to the same two message sets (A & B).

It will now be appreciated by one skilled in the art that the flow described above relates to just one way in which the invention could be implemented. For example, in an alternative embodiment, the tool first analyses all the messages in two message sets and makes a series of recommendations. The user can then address recommendations for each field in turn, choosing to accept or reject these. Any fields for which there are no recommendations, or for which the user does not like the suggested recommendations, are left to the user to define.

It will no doubt also now be appreciated by one skilled in the art that transformations for all messages in a message set may not be required. Further, a one to one mapping has been shown here. In practice n messages may be mapped to m messages (for example three messages may map to two messages.)

Figure 4:
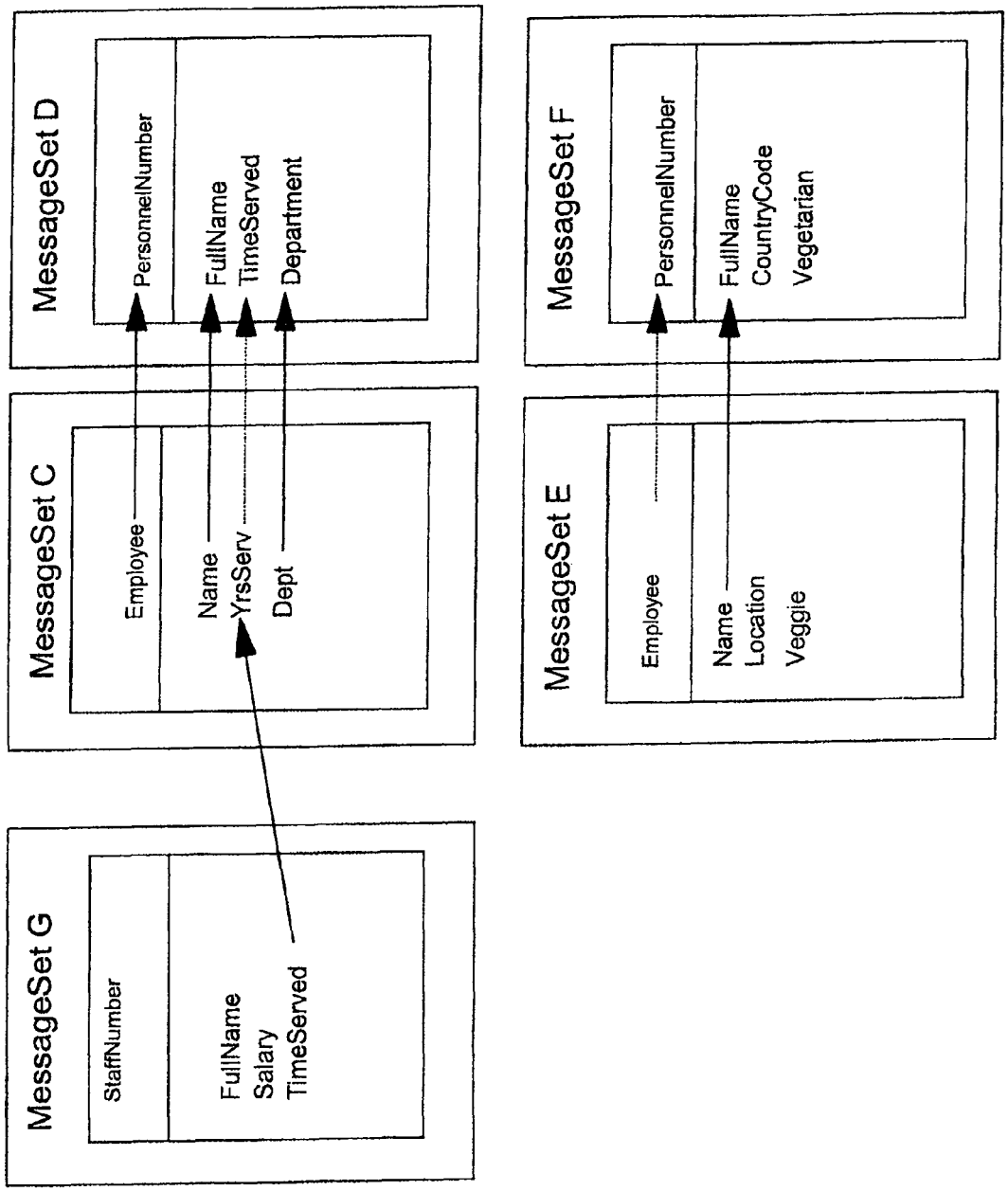

The suggestions for possible transformation definitions do not have to come from the same message set. FIG. 4 shows message sets C, D, E, F and G. Sets C and D relate to personnel records and the correspondence between messages (one shown) in the two sets have been defined prior to defining mappings for message sets E and F. Message sets E and F relate to catering records. The fact that Name in the employee message of set C is defined as mapping to FullName in the PersonnelNumber message of set D is used to suggest to the user that Employee.Name in message set E may map to PersonnelNumber.FullName in message set F. Further if the transformations between messages in set C and D are being defined, information from previous transformation definitions involving another set and C or D can be used.

In the example, StaffNumber.TimeServed (message set G) has been mapped to Employee.YrsServ (message set C). This information can be used to suggest that Employee.YrsServ may map to PersonnelNumber.TimeServed in message set D. (This assumes that the previously defined mapping works in reverse.)

Correspondence between message names as well as message fields may also be used. For example, the fact that the user has defined a link between the Employee message in set C and the PersonnelNumber message in set D may be used to suggest a link between the Employee message in set E and the PersonnelNumber message in set F. Such information is useful in prioritising suggestions to the user regarding field definitions.

When defining transformations between two message sets C and D, suggestions could be prioritised to the user based on some predefined rules. For example the priorities could be as follows:

1. Information from existing C and D message set transformation definitions has top priority.
2. Information from transformation definitions including one of message set C or D is prioritised next (e.g. C and G)
3. Information from any other transformation definition is prioritised last (e.g. E and F).

Figure 5:
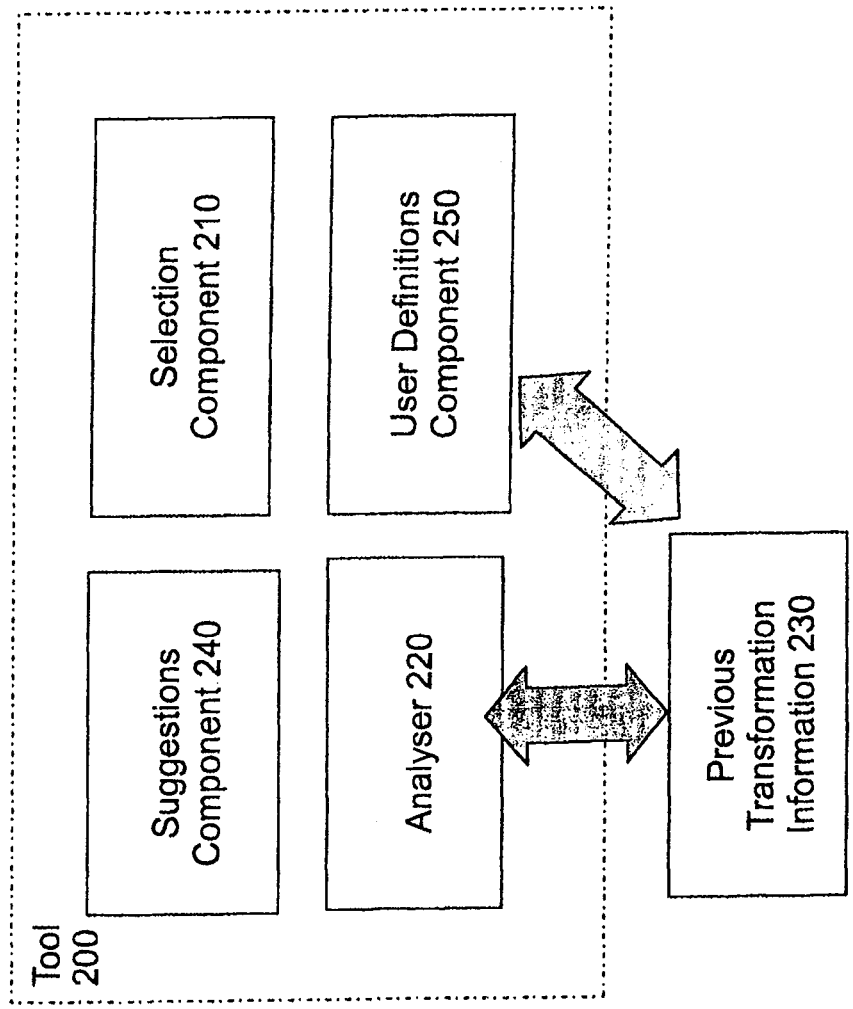

A tool implementing the invention is preferably implemented in computer software. This tool could be provided with the message broker/intermediary system, or adapter software (e.g. as shown in FIGS. 1a and 1b. The components of such a tool according to a preferred embodiment are shown in FIG. 5.

The tool 200 comprises a selection component 210. Using this component, the user can select two message sets between which to define transformations. Having made this selection, an analyser 220 component is invoked which scans messages in the selected message sets.

For each message and field, within the message sets, the analyzer determines whether it knows of previous transformation information which might be useful with regard to defining each message and field transformation. In order to do this, analyzer component 220 consults previous transformation definition information held in non-volatile storage 230. If it finds helpful information within storage 230, it uses such information to suggest possible definitions to the user via suggestion component 240. The user can then use selection component 210 to choose one of the suggested definitions.

If on the other hand no such useful information is held within storage 230, user definitions component 250 enables the user to define the correspondence between a message/field in the source message set and a message/field in the selected destination message set. This definition is then stored in storage 230 for possible future use.

Through aspects of the preferred embodiment of the present invention, mapping definitions from previous defining sessions are stored for future sessions. In this way the previously onerous task of defining transformation information is alleviated.

The present invention has been described in accordance with the embodiment shown, and one of ordinary skill in the art will readily recognize that there could be variations to the embodiments. For example, while the invention has been defined in terms of messages and messaging systems, the invention is not limited to such and is applicable to any environment where data of one format needs to be converted to data of another format. Accordingly, many modifications may be made by one of ordinary skill in the art without departing from the spirit and scope of the appended claims.

The invention claimed is:

1. A computer system for defining data mappings between data elements in a first data structure and data elements in a second data structure, the computer system executing instructions for:

selecting a first data element in the first data structure for mapping;
suggesting a first possible data mapping definition to a user based on a first previous data mapping definition, the first possible data mapping definition defining a mapping from the first data element in the first data structure to a first data element in the second data structure;
suggesting a second possible data mapping definition based on a second previous data mapping definition, the second previous data mapping definition defining a mapping from a data element in a fifth data structure to a data element in a sixth data structure;
prioritizing the first possible data mapping definition and the second possible data mapping definition based on a predefined rule; and
mapping the first data element in the first data structure to the first data element in the second data structure according to the first possible data mapping definition in response to acceptance of the first possible data mapping definition by the user,
wherein the first previous data mapping definition defines a mapping from a data element in a third data structure to a data element in a fourth data structure, at least one of the third and fourth data structures being different from the first and second data structures, and
wherein the predefined rule specifies the first possible data mapping definition is ranked higher than the second possible data mapping definition when each of the third and fourth data structures is part of a first data structure set containing the first data structure or is part of a second data structure set containing the second data structure and when at least one of the fifth and sixth data structures is not part of the first data structure set and is not part of the second data structure set.

2. The computer system of claim 1, wherein a data structure is a message and a data element in the data structure is a field in the message.

3. The computer system of claim 2, wherein the first previous data mapping definition comprises a message field to message field definition or a message name to message name definition.

4. The computer system of claim 1, wherein the first previous data mapping definition is a user defined data mapping definition.

5. The computer system of claim 1, wherein the first data structure is part of a first set of data structures and the second data structure is part of a second set of data structures and wherein at least one of the third and fourth data structures is part of the first set of data structures or part of the second set of data structures.

6. The computer system of claim 1, wherein the computer system further executes instructions for:

mapping the first data element in the first data structure to a second data element in the second data structure according to a data mapping definition defined by the user in response to rejection of the first possible data mapping definition and the second possible data mapping definition by the user; and
storing the data mapping definition defined by the user for future use.

7. The computer system of claim 1, wherein the predefined rule further specifies the first possible data mapping definition is ranked higher than the second possible data mapping definition when at least one of the third and fourth data structures is part of a first data structure set containing the first data structure or is part of a second data structure set containing the second data structure and when none of the fifth and sixth data structures are part of the first data structure set or part of the second data structure set.

8. The computer system of claim 1, wherein the first possible data mapping definition is based on a reverse of the first previous data mapping definition.

9. A computer readable medium encoded with a computer program for defining data mappings between data elements in a first data structure and data elements in a second data structure, the computer program comprising executable instructions for:
- selecting a first data element in the first data structure for mapping;
- suggesting a first possible data mapping definition to a user based on a first previous data mapping definition, the first possible data mapping definition defining a mapping from the first data element in the first data structure to a first data element in the second data structure;
- suggesting a second possible data mapping definition based on a second previous data mapping definition, the second previous data mapping definition defining a mapping from a data element in a fifth data structure to a data element in a sixth data structure;
- prioritizing the first possible data mapping definition and the second possible data mapping definition based on a predefined rule; and
- mapping the first data element in the first data structure to the first data element in the second data structure according to the first possible data mapping definition in response to acceptance of the first possible data mapping definition by the user,
- wherein the first previous data mapping definition defines a mapping from a data element in a third data structure to a data element in a fourth data structure, at least one of the third and fourth data structures being different from the first and second data structures, and
- wherein the predefined rule specifies the first possible data mapping definition is ranked higher than the second possible data mapping definition when each of the third and fourth data structures is part of a first data structure set containing the first data structure or is part of a second data structure set containing the second data structure and when at least one of the fifth and sixth data structures is not part of the first data structure set and is not part of the second data structure set.

10. The computer readable medium of claim 9, wherein a data structure is a message and a data element in the data structure is a field in the message.

11. The computer readable medium of claim 10, wherein the first previous data mapping definition comprises a message field to message field definition or a message name to message name definition.

12. The computer readable medium of claim 9, wherein the first previous data mapping definition is a user defined data mapping definition.

13. The computer readable medium of claim 9, wherein the first data structure is part of a first set of data structures and the second data structure is part of a second set of data structures and wherein at least one of the third and fourth data structures is part of the first set of data structures or part of the second set of data structures.

14. The computer readable medium of claim 9, wherein the computer program further comprises executable instructions for:
- mapping the first data element in the first data structure to a second data element in the second data structure according to a data mapping definition defined by the user in response to rejection of the first possible data mapping definition and the second possible data mapping definition by the user; and
- storing the data mapping definition defined by the user for future use.

15. The computer readable medium of claim 9, wherein the predefined rule further specifies the first possible data mapping definition is ranked higher than the second possible data mapping definition when at least one of the third and fourth data structures is part of a first data structure set containing the first data structure or is part of a second data structure set containing the second data structure and when none of the fifth and sixth data structures are part of the first data structure set or part of the second data structure set.

16. The computer readable medium of claim 9, wherein the first possible data mapping definition is based on a reverse of the first previous data mapping definition.

* * * * *